(12) United States Patent
Lo

(10) Patent No.: US 7,293,903 B2
(45) Date of Patent: Nov. 13, 2007

(54) LED ILLUMINATED GLOW STICK

(76) Inventor: Teddy Yeung Man Lo, 401 E. 34th St., Apt #N-11J, New York, NY (US) 10016

( * ) Notice: Subject to any disclaimer, the term of this patent is extended or adjusted under 35 U.S.C. 154(b) by 226 days.

(21) Appl. No.: 10/535,805

(22) PCT Filed: Aug. 27, 2004

(86) PCT No.: PCT/US2004/027848

§ 371 (c)(1),
(2), (4) Date: Jun. 1, 2005

(87) PCT Pub. No.: WO2005/108861

PCT Pub. Date: Nov. 17, 2005

(65) Prior Publication Data

US 2007/0041174 A1 Feb. 22, 2007

Related U.S. Application Data

(60) Provisional application No. 60/566,042, filed on Apr. 27, 2004.

(51) Int. Cl.
*F21V 8/00* (2006.01)
(52) U.S. Cl. .................. 362/555; 362/190; 362/109; 362/565; 362/577
(58) Field of Classification Search ............. 362/190, 362/191, 109, 555, 565, 577
See application file for complete search history.

(56) References Cited

U.S. PATENT DOCUMENTS

| 4,600,974 A | 7/1986 | Lew et al. |
|---|---|---|
| 4,901,209 A | 2/1990 | Nitz |
| 4,996,976 A | 3/1991 | Nakagawa |
| 5,081,568 A | 1/1992 | Dong et al. |
| 5,212,333 A | 5/1993 | Aryee |
| 5,722,757 A | 3/1998 | Chien |
| 5,980,063 A | 11/1999 | Ford et al. |
| 6,238,076 B1 | 5/2001 | Pascale et al. |
| 6,592,240 B2 * | 7/2003 | Camarota et al. ........... 362/399 |
| 6,820,996 B1 | 11/2004 | Fan |
| 2004/0160769 A1 | 8/2004 | Currie et al. |

(Continued)

FOREIGN PATENT DOCUMENTS

DE 196 32 699 2/1998

(Continued)

OTHER PUBLICATIONS

Written Opinion Of The International Searching Authority issued Mar. 7, 2005 by the International Searching Authority in connection with related PCT International Application No. PCT/US04/27848, filed Aug. 27, 2004.

(Continued)

*Primary Examiner*—Laura Tso
(74) *Attorney, Agent, or Firm*—Dickstein, Shapiro, LLP.

(57) ABSTRACT

An LED illuminated glow stick apparatus uses multicolored LEDs to illuminate an optically transmitting tube that is encased in a soft cushion that is at least partially transparent. The LED illuminated glow stick is capable of glowing in a variety of different colors. It is reusable and rechargeable and safe for children. The LED illuminated glow stick is useful as safety equipment and as a toy. The LED illuminated glow stick may additionally include an LED flashlight.

12 Claims, 4 Drawing Sheets

U.S. PATENT DOCUMENTS

2006/0109676 A1  5/2006  Lo

FOREIGN PATENT DOCUMENTS

| EP | 0 899 503 | 3/1999 |
|---|---|---|
| FR | 2 836 579 | 8/2003 |
| JP | 2002315617 | 10/2002 |
| WO | WO 00/63735 | 10/2000 |
| WO | WO 02/26555 | 4/2002 |
| WO | WO 03/102643 | 12/2003 |

OTHER PUBLICATIONS

International Search Report issued Mar. 7, 2005 by the International Searching Authority in connection with related PCT International Application No. PCT/US04/27848, filed Aug. 27, 2004.

Fok, Alice, "Evolution in Art, NYC—Interview with Teddy Lo", *Not a Rag*, pp. 6-14 (Jun. 2004).

Morphology—Sep. 22-Oct. 19, 2003 Exhibition Poster, http://www.ledartist.com/morphposter_small.jpg. (May 19, 2005).

Oct. 4, 2006 Supplementary Partial European Search Report issued by the European Patent Office in connection with European Patent Application No. 04782345.5.

Nov. 9, 2006 PCT Notification Concerning Transmittal of Copy of International Preliminary Report on Patentability (Chapter I of the Patent Cooperation Treaty) issued by The International Bureau of WIPO in connection with related PCT Application No. PCT/US2004/027848.

Jan. 17, 2007 Supplementary European Search Report issued by the European Patent Office in connection with European Application No. 04782345.5.

Jun. 1, 2007 PCT International Search Report and Written Opinion issued by the International Searching Authority in connection with related PCT International Application No. PCT/EP2006/009820.

ANONYMOUS, "Specifications of our Fiber and Cable," Internet Article, ©2001 Fiber Optics Products Inc.; retrieved on Apr. 25, 2007 from Internet URL: http://ww.fiberopticproducts.com/Specs.htm>.

* cited by examiner

LED ILLUMINATED GLOW STICK

This application is a §371 national stage of PCT International Application No. PCT/US04/27848, filed Aug. 27, 2004, which is a continuation and claiming the benefit of U.S. Ser. No. 60/566,042, filed Apr. 27, 2004, the contents of which are hereby incorporated by reference into the present application.

FIELD OF THE INVENTION

The present invention relates to the field of glow stick units and, more particularly, to an LED illuminated glow stick.

BACKGROUND OF THE INVENTION

A glow stick is commonly known to be a small plastic tube filled with luminescent chemicals. When mechanically activated, chemical-based glow sticks will glow brightly, generally emitting a single vibrant color that is readily visible, especially in the dark.

Chemical-based glow sticks are activated by initiating a light-emitting chemical reaction within the unit, generally by bending the flexible plastic tube thereby breaking apart fragile partitions within the tube and allowing various chemicals to react. Once the chemical reaction has begun, it cannot be stopped until it has gone to completion. Chemical-based glow sticks will continue to emit light for some determinable length of time, generally on the order of several hours, after which time the glow stick will be exhausted and will no longer emit light. Exhausted chemical-based glow sticks cannot be recharged and are generally discarded after the single use.

Because of their ability to glow brightly in a vibrant color, glow sticks are very useful as safety devices for vehicles and pedestrians, especially when used at night. Moreover, glow sticks may also be highly entertaining and are commonly used as, or incorporated into, toys and novelty devices.

Although useful and entertaining, chemical-based glow sticks can only be used once after which they must be discarded. Disposable products such as chemical-based glow sticks exacerbate the growing global problem of managing excess waste. Moreover, because they are composed of plastics and liquid chemicals, chemical-based disposable glow sticks can be easily perceived as an environmental threat. Moreover, because chemical-based glow sticks cannot be repeatedly activated and deactivated, they are not well suited for incorporation into signs and other devices, such as bicycles and automobiles.

While glow sticks come in a variety of colors, a single glow stick is only capable of glowing in one color. This characteristic limits the utility and entertainment value of the device.

Electroluminescent lights are similar to glow sticks. Electroluminescent lights are generally made from glass tubes that are filled with an electroluminescent gas. When an electric current is applied, these lights glow brightly. By varying the gas used and the phosphor coating applied to the surface of the tube, electroluminescent lights can be produced that glow in a number of vibrant colors. For example, neon lights glow bright red, while fluorescent lights glow bright white.

Because electroluminescent lights can be activated and deactivated, they are well suited for lighted signs and incorporate well into other devices, such as automobiles. Electroluminescent lights are not, however, well suited for emergency use or as toys. Electroluminescent lights generally require high voltages to stimulate the electroluminescence effect. To generate these high voltages, large and relatively heavy power converters or transformers are generally required. These power converters render electroluminescent lights poorly suited for incorporation into small portable devices. Moreover, because of their relatively high-voltage and high-power consumption, electroluminescent lights are not well suited for being powered by small batteries. Electroluminescent lights are also generally constructed from glass tubes. This feature and the fact that electroluminescent lights generally require high voltage, makes them too dangerous for use as toys.

A glow stick can be used as a safety device, a toy, and as a decorative accent when incorporated into another device. For example, a glow stick can be used at night by police to direct traffic, by a distressed vehicle to signal caution to passing motorists, and by pedestrians and cyclists on the roads at night. Glow sticks can be used as a toy by young and old children, especially in dark places. Glow sticks can be mounted to automobiles and inside computers to create an eye-catching accent.

Chemical-based glow sticks manufactured from plastic tubes filled with chemicals have the disadvantages of being single-use and must be disposed of thereafter. In addition to not being environmentally friendly, these glow sticks are frequently manufactured using toxic chemicals, thereby rendering them unfit for use by children. Moreover, these chemical-based glow sticks can not be turned on and off or made to blink. Moreover, while chemical glow sticks can be manufactured in several different colors, a single glow stick is limited to glowing in one fixed color. These shortcomings of the chemical-based glow stick limit their entertainment value, as well as their usefulness as a safety device.

Electroluminescent lights generally are manufactured from glass and require a high voltage to operate. As a result, such devices are generally heavy, fragile and create a risk of high-voltage electric shock and laceration by broken glass. These devices are therefore not well suited for portable use or battery operation: Moreover, these devices are also generally unfit for use by children.

OBJECT AND SUMMARY OF THE INVENTION

Accordingly, it is an objective of the present invention to provide an LED illuminated glow stick apparatus, including at least one multicolored LED, an optically transmitting tube that illuminates when the multicolored LED is activated, control circuitry for controlling the multicolored LEDs to illuminate in multiple colors, and a soft cushion that encases the optically transmitting tube, wherein the soft cushion is at least, partially transparent. It is another objective of the present invention to provide an LED illuminated glow stick apparatus additionally comprising an LED flashlight.

DETAILED DESCRIPTION OF PREFERRED EMBODIMENTS

According to one embodiment, the present invention provides an LED illuminated glow stick that is reusable, rechargeable, capable of generating multiple colors, capable of flashing in multiple patterns, capable of being deactivated and reactivated, capable of functioning as an LED flashlight and that is portable and fit for use by children. Moreover, the LED illuminated glow sticks according to the present invention can be interlocked with one another to enhance their safety and entertainment value.

Figure 1:
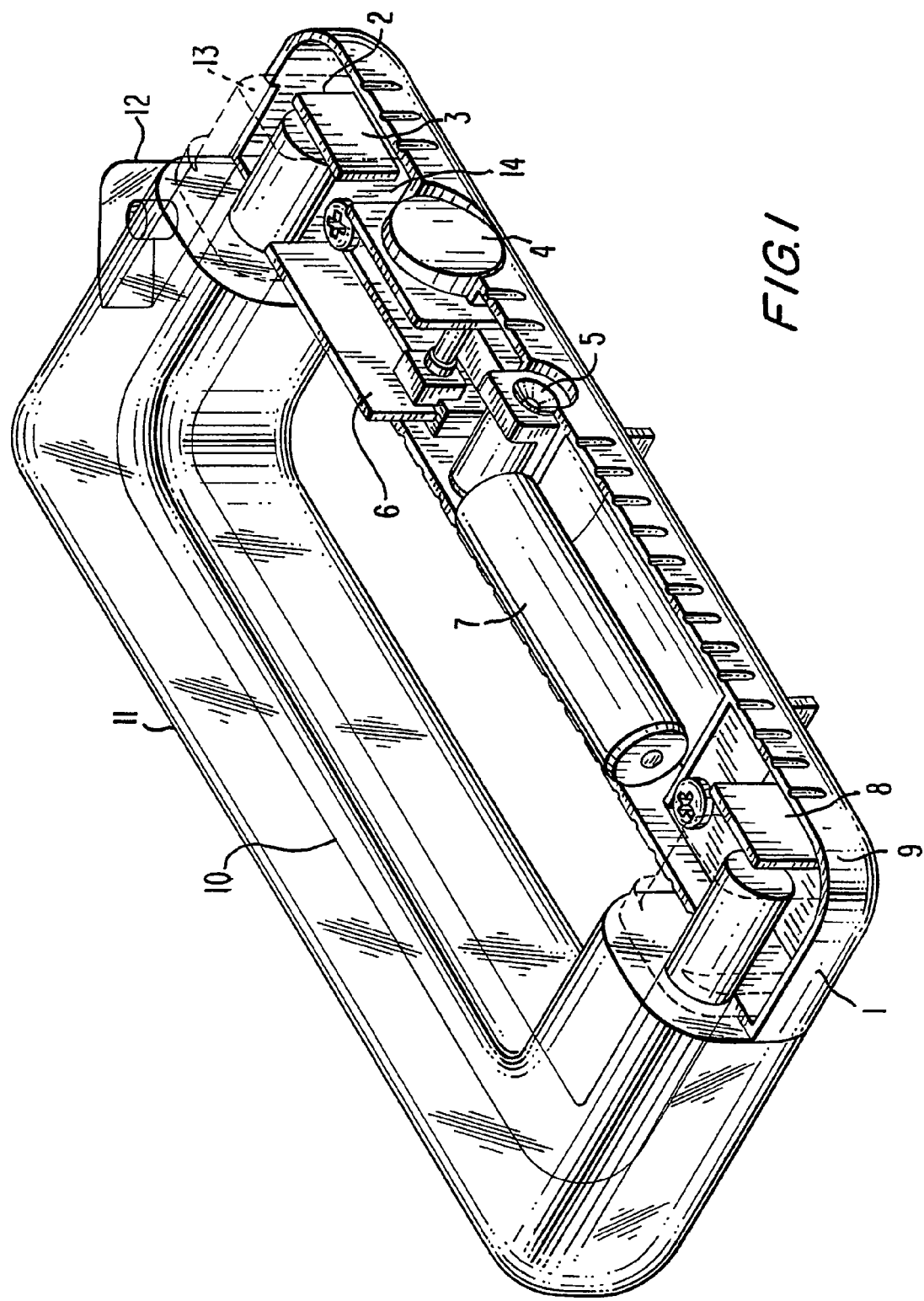
FIG. 1 is a perspective view partially in phantom of an LED glow stick in accordance with one embodiment of the present invention.

FIG. 1 shows an LED illuminated glow stick according to a preferred embodiment in a phantom view so that the interior of the glow stick can be seen. The handle 1 can be constructed of a hard material such as ABS plastic and can be covered with a soft grip material such as soft rubber. The handle can be ergonomically built to adapt to the shape of a hand. This soft grip enhances the handling capability. Moreover, the grip may be ergonomically formed to better receive the shape of a closed hand. The soft character of the handle 1 also enhances the entertainment value of the device by providing an interesting tactile experience.

A cushion 11 that is at least partially transparent or translucent is attached to the handle 1 forming a single body in the form of a rectangle, square or "D" shape. The cushion 11 is also formed from a soft material such as silicon, thereby enhancing the tactile experience of the device while also being capable of transmitting light. Within the cushion 11 is a solid light transmitting tube 10. This tube is capable of transmitting light from the LED light sources 2 and 9, so that the whole tube 10 can be illuminated. The tube 10 is formed from a material capable of transmitting light while illuminating, for example, acrylic can be used.

According to one embodiment of the present invention, there are two multi-color LEDs 2 and 9, one at either end of the solid tube 10. Each multi-color LED is formed from red, blue, and green LEDs combined together on the respective LED printed circuit board (PCB) circuit board 3 and 8. Each multicolored LED 2, 9 is capable of generating a plurality of distinct colors by turning on or off various combinations of red, blue, and green. Two multicolored LEDs 2 and 9 are together capable of generating even more colors because each individual color red, blue, and green, can be off, one on, or two on. According to another embodiment of the current invention, more than two multi-colored LEDs are used. For example, up to six multicolor LEDs can be used.

The multicolored LEDs 2 and 9 can be mounted on separate LED PCB circuit boards 3 and 8, respectively. These LED PCB circuit boards 3 and 8 are each electrically connected to the control PCB circuit board 6 containing control elements, such as an integrated circuit (IC) chip (not shown), by wire connections. Alternatively, the LEDs 9 and 9 and the control elements can be mounted on the same PCB and connected by printed circuit paths. The IC chip is capable of controlling the multicolored LEDs 2 and 9 to produce a plurality of patterns and effects, such as a single still color, a smooth transition or gradient across a range of colors, a strobe of a single color, or a switching from color to color.

A flashlight LED 13 can be built into the case 1. This flashlight LED 13 can be used to provide light to see by in dark environments when the use of a flashlight is desired. This flashlight LED 13 may be a multicolored LED and may be capable of emitting one or more colors. For example, the flashlight LED 13 may emit white light.

A switch button 4 is connected to the control PBC 6, either electrically or mechanically, such that the control IC (not shown) receives a signal when the button is pressed. The button is used to toggle between the plurality of patterns and modes and a power off or standby mode.

Multiple buttons and switches can be used to control the functioning of the glow stick, for example, a switch 14 for disconnecting the battery power may be included. This switch 14 may be a toggle switch with multiple positions. According to one embodiment of the present invention, the switch 14 can be a three position toggle switch where the up position activates the flashlight LED 13, the down position activates the transmitting tube 10 and the center position disconnects the battery power.

Power is supplied by one or more batteries 7 located inside the case 1, as shown in FIG. 1. These batteries may be removable or nonremovable, and may be rechargeable or non-rechargeable. In one embodiment of the present invention, three AAA sized non-removable rechargeable batteries are used.

A power input port 5 can be built into the case 1. This power input port 5 receives a low DC voltage that can be used to charge the batteries 7 or to directly power the apparatus.

According to one embodiment of the present invention, a tab 12 extends from the apparatus. The tab 12 contains a hole that can be threaded with a string to be hung, for example, around the neck of a user. Moreover, the apparatus can be attached to a string and spun to create an amusing light pattern.

Figure 2C:
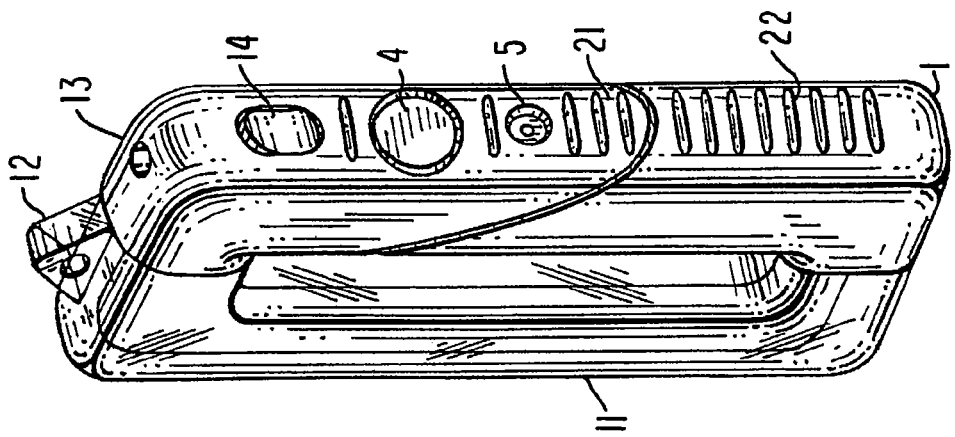
FIGS. 2A, 2B and 2C are a perspective view, another perspective view and an elevational view, respectively, of the LED illuminated glow stick shown in FIG. 1.
Figure 2B:
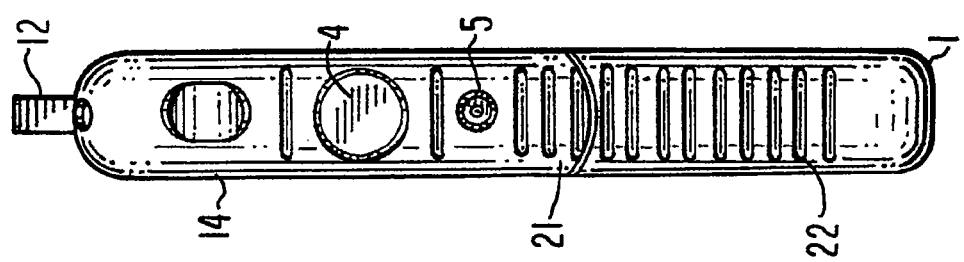
Figure 2A:
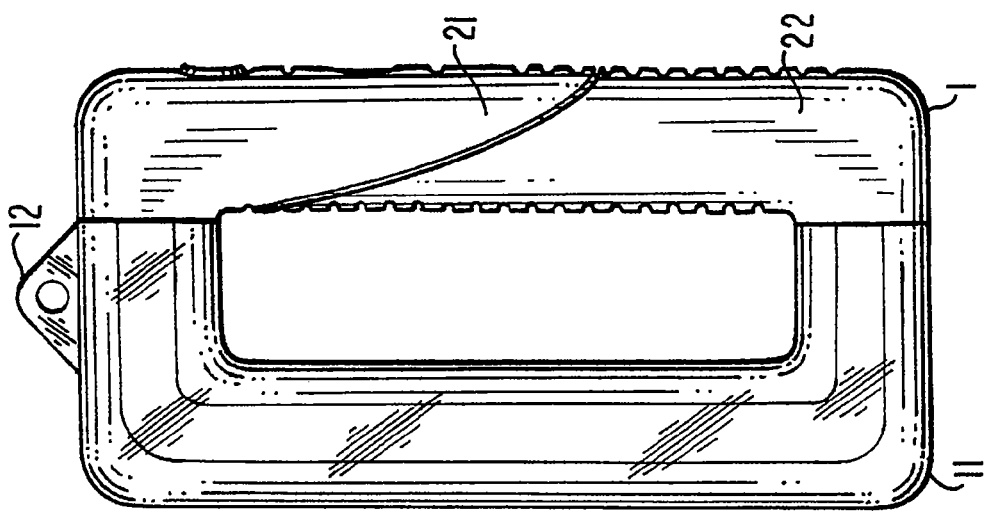

FIGS. 2A, 2B and 2C showed additional views of the LED illuminated glow stick shown in FIG. 1. The case 1 may consist of a lop case section 21 and a bottom case section 22 to facilitate access to the batteries 7.

Figure 3B:
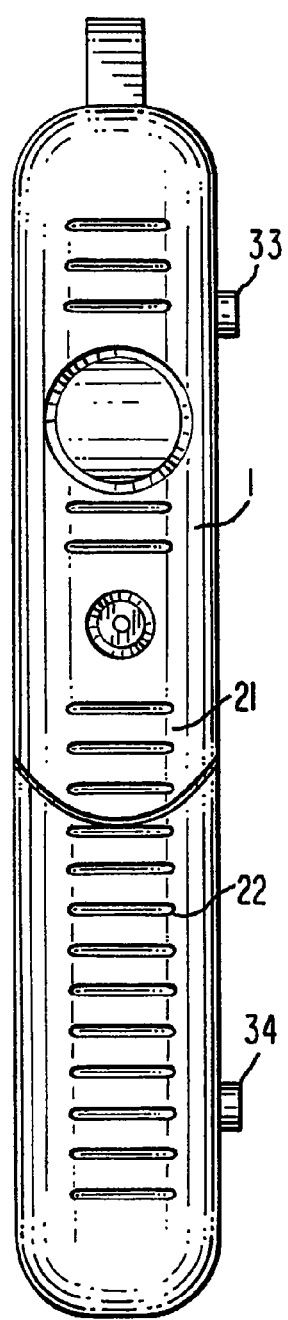
FIGS. 3A and 3B are an elevational view and a perspective view, respectively, of the LED illuminated glow stick shown in FIG. 1.
Figure 3A:
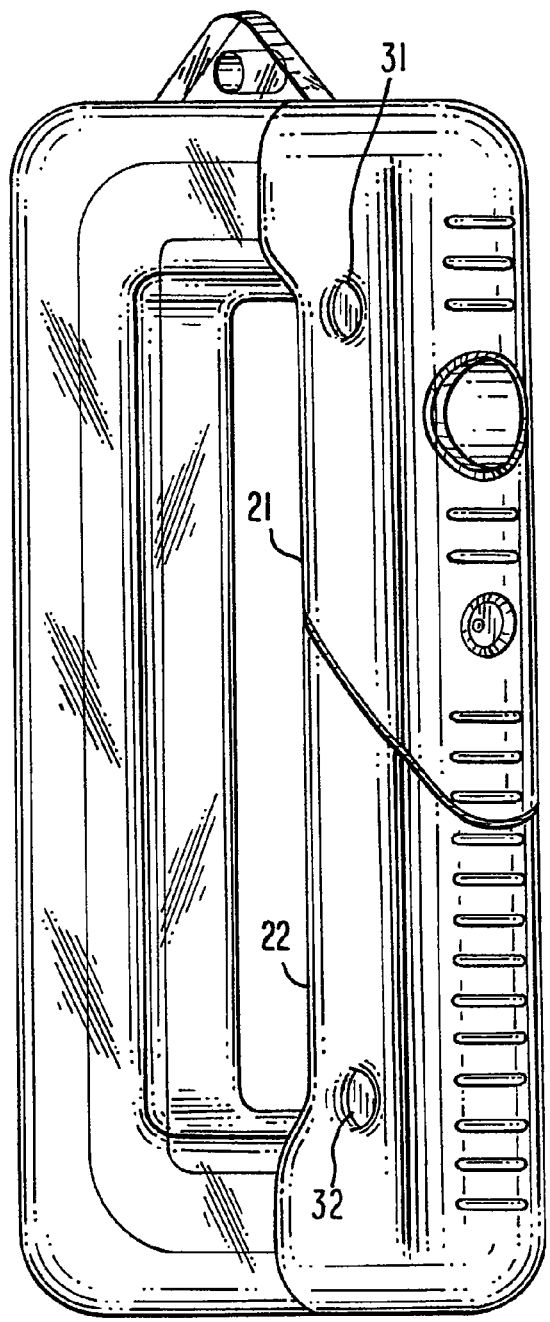

FIGS. 3A and 3B show additional features of the LED illuminated glow stick shown in FIG. 1. FIG. 3A shows a first side of the LED illuminated glow stick that was shown in FIG. 1. Built into the case 1 are an upper hole 31 and a lower hole 32. FIG. 3B shows a second side of the LED illuminated glow stick that was shown in FIG. 1. Formed on the case 1 are an upper peg 33 and a lower peg 34. The pegs 33 and 34 and holes 31 and 32 are constructed such that a first LED illuminated glow stick according to the present invention can mate with a second LED illuminated glow stick by placing a peg in a hole. In this way, two or more LED illuminated glow sticks can be mated to form a larger and more visually noticeable apparatus, thereby enhancing both the safety and entertainment values of the apparatus.

Figure 4:
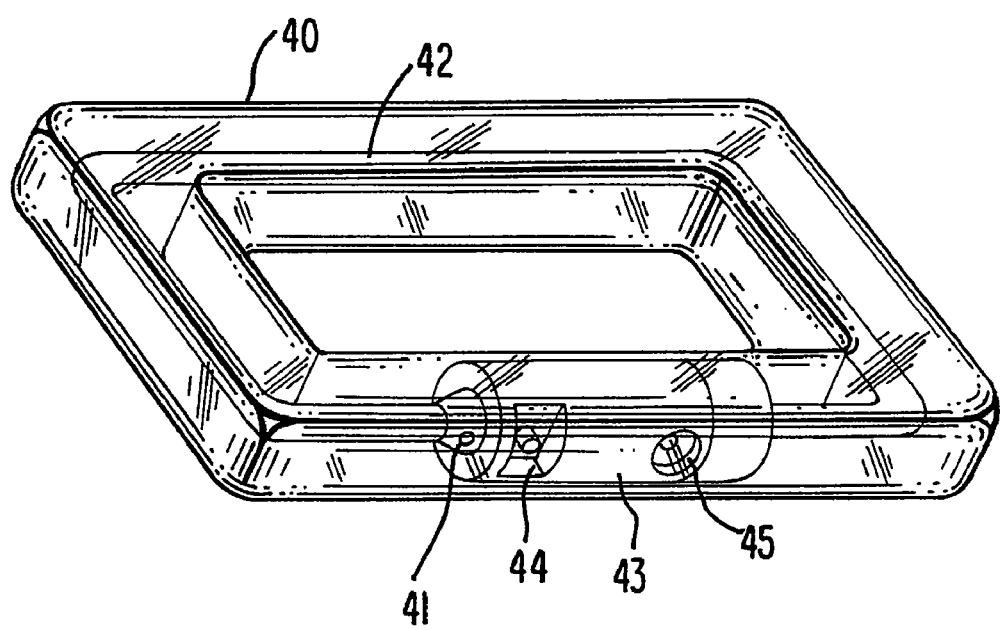
FIG. 4 is a perspective view partially in phantom of an LED glow stick in accordance with a second embodiment of the present invention.

FIG. 4 shows an LED illuminated glow stick according to another embodiment. In this embodiment, a small case 43 contains the control PCB (not shown), the batteries (not shown) a button 44, a DC power input port 45, and one or more multicolored LEDs 41. A transparent or translucent cushion 40 forms a single body shaped as a rectangle, square, or "D". The small case 43 is mounted inside the cushion 40, or alternatively, the small case 43 has approximately the same diameter as the cushion 40 and the cushion is attached to the case 43 at each end. The cushion 40 is formed from a soft material, such as silicon, thereby enhancing the tactile experience of the device while being capable of transmitting light. Within the cushion 40 is an optical transmitter 42. This optical transmitter is capable of transmitting light from the LED light sources 41 throughout the body of the optical transmitter 42 so that the whole optical transmitter can be illuminated. The optical transmitter 42 is formed from a material capable of transmitting light while being illuminated for example, acrylic can be used.

It is to be understood that the foregoing is presented by way of example only and that many variations and adaptations may be made by one with skill in the art, so that the scope of the invention is limited only by the appended claims.

The invention claimed is:

1. An LED illuminated glow stick apparatus, comprising:
    at least one multicolored LED;
    an optically transmitting tube in proximity to said multicolored LED that illuminates when said multicolored LED is illuminated;
    a control circuit for controlling said at least one multicolored LED to be illuminated, wherein said control circuit is encased in a handle unit; and
    a soft cushion that encases the optically transmitting tube, said soft cushion being at least partially transparent;
    wherein said multicolored LED is mounted on a printed circuit board ("PCB") that is electrically connected to said control circuit.

2. The LED illuminated glow stick apparatus according to claim 1, wherein at least one multicolored LED comprises two multicolored LEDs with one of said two multicolored LEDs placed at each end of said optically transmitting tube.

3. The LED illuminated glow stick apparatus according to claim 1, wherein said control circuit controls said multicolored LED to illuminate said optically transmitting tube to produce a smooth transition across a range of colors.

4. The LED illuminated glow stick apparatus according to claim 1 wherein said control circuit controls said multicolored LED to continuously illuminate said optically transmitting tube in any one of a plurality of colors.

5. The LED illuminated glow stick apparatus according to claim 1, wherein said control circuit controls said multicolored LED to strobe said optically transmitting tube in any one of a plurality of colors.

6. The LED illuminated glow stick apparatus according to claim 1, wherein said control circuit controls said multicolored LED to strobe said optically transmitting tube while switching between a plurality of colors.

7. The LED illuminated glow stick apparatus according to claim 1, additionally comprising a mechanism for interlocking with another glow stick apparatus.

8. The LED illuminated glow stick apparatus according to claim 1, wherein said handle unit is ergonomically formed to receive the shape of a closed hand.

9. The LED illuminated glow stick apparatus according to claim 1, wherein said handle unit is soft.

10. The LED illuminated glow stick apparatus according to claim 1, additionally comprising a tab attached to the LED illuminated glow stick apparatus with a hole in said tab for hanging said apparatus from a string.

11. The LED illuminated glow stick apparatus according to claim 1, additionally comprising an LED flashlight.

12. The LED illuminated glow stick apparatus according to claim 1, additionally comprising the LED illuminated glow stick apparatus is in a shape of a rectangle, a square, or a "D".

\* \* \* \* \*